Patented Aug. 17, 1926.

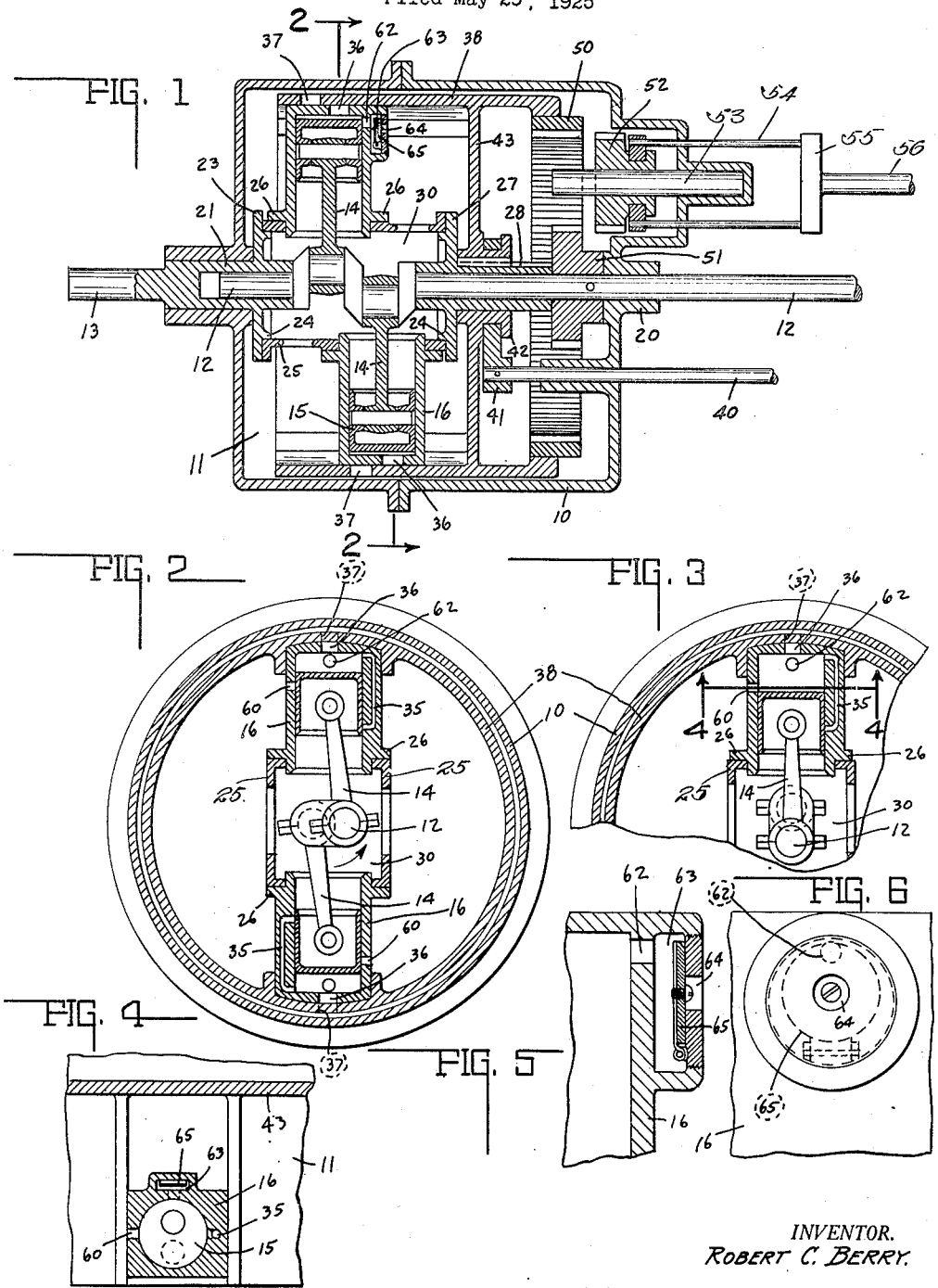

1,596,709

UNITED STATES PATENT OFFICE.

ROBERT C. BERRY, OF INDIANAPOLIS, INDIANA, ASSIGNOR OF TWO-THIRDS TO WALTER S. PULLEN, OF HILLSDALE, MICHIGAN, AND ALBERT T. POTTER, OF INDIANAPOLIS, INDIANA.

CLUTCH AND SPEED-CONTROL MECHANISM.

Application filed May 29, 1925. Serial No. 33,802.

The object of this invention is to improve transmissions, particularly speed changing transmissions, which replace both the clutch and gear shift transmission used heretofore in automobiles. It dispenses with the clutch and avoids the faults and disadvantages of the usual gear shift construction, and enables the automobile or machinery to be operated at any speed instead of one, two or three specific speeds, and also enables the transmission to have a cushion effect in its operation, and greatly simplifies the operation of driving an automobile.

A feature of the invention consists in an oil or liquid transmission, particularly of the kind herein described, wherein the power is transmitted from the driving shaft to the driven shaft through pistons in cylinders operating in an oil chamber and having means for opening and closing communication between the cylinders and oil chamber, so that when the cylinders are in communication with the oil chamber, the pistons will reciprocate and pump oil and thus idle and not transmit full power, but when the cylinders are not in communication with the oil chamber, the pistons can not operate but will serve as a clutch element to transmit power to the driven shaft, or, in other words, lock the driving and driven shafts.

Another feature of the invention, or at least effect of said arrangement, is that the communication between the cylinders and oil chamber can be modified easily and thus the speed controlled and any desired speed adopted.

Also the invention includes the idea of means for reversing the operation of the transmission and also means for enabling the crank shaft always to pass centers instead of stopping on centers.

The full nature of the invention will be understood from the accompanying drawings and the following description and claims:

In the drawings, Figure 1 is a central longitudinal section of the transmission, parts being broken away and in position to transmit power to the driven shaft and drive the automobile in the normal forward direction. Fig. 2 is a cross section on the line 2—2 of Fig. 1 with the pistons in different position from what they are shown in Fig. 1. Fig. 3 is the upper part of Fig. 2 with the piston at its limit of stroke inward. Fig. 4 is a section on the line 4—4 of Fig. 3. Fig. 5 is the upper right-hand corner of the upper cylinder in Fig. 1 on a larger scale. Fig. 6 is an elevation of the right-hand side of Fig. 5.

There is a transmission casing 10 in which there is a chamber 11 that we will call the oil chamber as it is filled with lubricating oil. Centrally mounted in it is a motor shaft or driving shaft 12 coming from the engine. In alignment with it there is a driven shaft 13 which transmits power to the driving wheels of the automobile. The driving shaft 12 is a crank shaft having two oppositely extending cranks with which piston rods 14 are mounted that extend to pistons 15 operating in cylinders 16. As shown, these are diametrically opposite each other in the oil chamber 11, but offset as shown.

The driving shaft 12 is mounted in a bearing 20 in one end of the casing and its extreme end is loosely mounted in the tubular end 21 of the driven shaft 13. It is thus seen that the driving shaft is free to move without driving the driven shaft, as long as the pistons are free to move. The driving shaft and pistons move together as a unit or remain stationary as a unit.

The driven sleeve 21 has a disk 23 that is in frictional engagement with the left-hand side of the casing 10 and has a shoulder 24 on which one end of the crank case 25 is secured. The other end of the crank case is secured to a similar shoulder 24 on a disk 27 similar to the disk 23 and integral with a sleeve 28 mounted loosely on the driving shaft 12, as seen.

The cylinders 16 extend partly into the crank case and are secured thereto by the shoulders 26. The cylinders 16 may be in communication with the oil chamber 11 through a port 36 in the end of each cylinder, and a port 37 in the large throttle sleeve 38. The latter surrounds the series of cylinders and fits tightly over the convex ends thereof and is longitudinally slidable thereon so as to bring said ports 36 and 37 into registry, or out of registry. The latter position is shown in Fig. 1, but if the throttle sleeve 38 were moved to the right hand from its position in Fig. 1, the ports 36 and 37 would be brought into registry. The throttle sleeve 38 is operated by a rod 40 which extends to a position where the driver of the automobile can operate the same, and it is secured to a diametrical plate 43 secured to the throttle sleeve 38. When the rod 40 is pulled to the right hand, as shown in Fig. 1, it will move the throttle sleeve 38 into a position to cause the ports 36 and 37 to register, and when it is moved to the left, the throttle sleeve will be brought into the position shown in Fig. 1. The sleeve 28 which carries the throttle sleeve 38 is sufficiently long to permit the desired extent of reciprocation of the throttle sleeve, as shown.

It is noted that the throttle sleeve 38 fits loosely enough in the casing 10 to permit oil to pass around it and enter the cylinders through said ports 36 and 37, when they register. Also the throttle sleeve 38, cylinders 16, crank case 25, sleeve 21 and driven shaft 13 constitute a unit rotating or not all together.

When the ports 36 and 37 fully register so that the cylinders are in communication with the oil chamber 11, the transmission will idle, as the pistons will freely reciprocate during the rotation of the driving shaft 12 and thus produce the same effect as when the clutch of the arrangement heretofore used is released, except that oil will be pumped through the ports 36 and 37. No power would be transmitted to the driven shaft 13 because the end of the shaft 12 is round within the sleeve 21. But if the throttle sleeve 38 is moved to the position shown in Fig. 1, so that the cylinders are not in communication with the oil chamber 11, the pistons cannot reciprocate or operate, and the parts will act like a clutch and drive the driven shaft, as the driving shaft 12 will cause the unit to revolve or rotate, including the piston cylinders 16, the crank case 25, disk 23, sleeve 21 and driven shaft 13. In other words, the driving shaft 12 will actuate the driven shaft 13 through said intermediate means, as the pistons cannot reciprocate and hence they will carry around the cylinders 16 and associated unit. The joints between the ends of the cylinders 16 and the valve cylinder 38 are tight because there is a coating of oil between them so that there is effective actuation of the driven shaft 13 without any loss of power.

The speed is changed or controlled by moving the throttle sleeve 38 so as to bring the ports 36 and 37 into registry. When they are slightly in registry, there will be a slow reciprocation of the pistons 15 which will cause a correspondingly slow speed of the driven shaft 13. As the ports are brought more and more into registry, the driven shaft will be operated at correspondingly diminishing speed until no power is transmitted when the ports 36 and 37 fully register. This enables one to obtain any speed by a proper movement of the rod 40 so that the transmission is not limited to two speeds or three speeds or ten speeds, and the transmission changes at any time by the further movement of the same parts and all the trouble arising from shifting gears in the usual gear transmissions, are avoided. Not only is this true, but the change of the transmission for different speeds is always gradual so that there is no unusual strain brought upon the mechanism, as often occurs in the operation of gear shifting transmission.

The reverse or backward operation of the driven shaft 13 is obtained by providing a large internal gear 50 in rigid connection with the throttle sleeve 38, as shown, and concentric with the driving shaft 12 and providing a fixed gear 51 on the driving shaft 12 in position to be engaged by the reversing gear 52 when it is moved from the position shown in Fig. 1, into mesh with the gear 51 and the internal gear 50. Obviously this will cause a reverse rotation of the throttle sleeve 38 and since it is splined on the sleeve 28, as shown in Fig. 1, which is associated, as heretofore explained, rigidly with the crank case 25 and driven shaft 13, the rotation of said driven shaft will be reversed. The reversing gear 52 is slidable on a spindle 53 fixed in the casing 10, by operating rods 54, disk 55 and operating rod 56. It is noted that the throttle sleeve 38 always rotates with the driven shaft and associated parts and it is rotated by the driving shaft through the intermediation of the pistons when they cannot reciprocate freely in their cylinders, but there is no transmission when the pistons can reciprocate freely in their cylinders, that is, when the ports 36 and 37 register with each other, except when parts are in reverse.

The cylinders 16 have ports 60 in their sides, as seen in Figs. 2 and 3, so as to permit the ready exit or inlet of oil during the beginning of the outward stroke of the pistons. The inner limit of movement of the piston is shown in Fig. 3, and the port 60 is immediately beyond the piston. There is also a by-pass 35 in each cylinder leading from the extreme end inward to a point below the piston when it is at its outer limit of movement. When the piston is at its inner limit of movement, as shown in Fig. 3, the by-pass is closed by the piston. After the piston has moved outward somewhat to the position shown in Fig. 2, it will have closed also the port 60 and at the same time closes the by-pass 35. That is the locked position of the pistons or the position occupied by them while transmitting power to the driven shaft. For if when the piston is in the position shown in Fig. 2, the throttle sleeve 38 is in the position shown in Fig. 1, with the ports 36 and 37 out of registry, the piston cannot move outward because the end of the cylinder is closed and the fluid in the closed chamber in the end of the cylinder will prevent the further outward movement of the piston, as said chamber is full of oil which cannot escape or be condensed.

If, however, when the ports 36 and 37 are not closed until after the piston has moved somewhat beyond the position shown in Fig. 2, outwardly and then the ports be closed, the piston can continue its outward movement because of the by-pass 35 leading from the outer end of the cylinder, and likewise the piston can move inward because of the port 62 in the side of each cylinder near its end leading from a chamber 63 having a port 64 closed by a check valve 65. The check valve will permit the inlet of oil to the outer end of the piston, but will prevent the escape of oil through the port 62. The function of the inlet port 62 controlled by the check valve 65 and of the by-pass 35 leading from the outlet end of the cylinder inward, is to prevent the pistons and crank shafts stopping on a dead center, as the extreme outward limit of movement or the extreme inward limit of movement thereof, when the ports 36 and 37 happen to be closed. Hence, the locking or clutching position of the pistons is reached only by the outward movement of the pistons to substantially the position shown in Fig. 2, as heretofore explained.

The details of the device herein shown are presented merely for the purpose of explaining the general nature of the construction and operation of this transmission and the invention is not necessarily limited to such details, but they may be modified without departing from the spirit of the invention.

The invention claimed is:

1. Clutch and speed control mechanism including a casing adapted to contain liquid, a driving crank shaft extending into the casing, a driven shaft in alinement with the driving shaft, a crank case surrounding the crank shaft and rigidly secured to the driven shaft, radially extending cylinders secured to the crank case with ports in their outer ends, pistons connected with the crank shaft and operating in said cylinders, a throttle sleeve in the casing surrounding the outer ends of the series of cylinders and with ports therein adapted to register with the ports in the ends of the cylinders and having an inwardly extending plate slidably associated with said crank case, and an externally operable means connected with said plate for longitudinal adjustment of the throttle sleeve to bring said ports into and out of register with each other.

2. Clutch and speed control mechanism including a casing adapted to contain liquid, a driving crank shaft extending into the casing, a driven shaft in alignment with the crank shaft, a crank case surrounding the crank shaft and secured to the driven shaft, radially extending pistons mounted on the crank shaft, cylinders secured to the crank case for said pistons with ports in their outer ends, a throttle sleeve in the casing surrounding the outer ends of the series of cylinders and with ports therein adapted to register with the ports in the ends of the cylinders, a sleeve surrounding the driving shaft and secured to the crank case on which said throttle sleeve is slidable, and externally operable means for adjusting the position of the throttle sleeve.

3. Clutch and speed control mechanism including a casing adapted to contain liquid, a driving crank shaft extending into the casing, a driven shaft in alignment with the crank shaft, a crank case surrounding the crank shaft and secured to the driven shaft, radially extending pistons mounted on the crank shaft, cylinders secured to the crank case for said pistons with ports in their outer ends, means within the casing externally operable for controlling the admission of liquid from the casing into the ends of the cylinders, a port in the side of each cylinder near its outer end, and a check valve for said port adapted to admit fluid to the cylinder but prevent fluid from leaving the cylinder, substantially as and for the purpose set forth.

4. Clutch and speed control mechanism including a casing adapted to contain liquid, a driving crank shaft extending into the casing, a driven shaft in alignment with the crank shaft, a crank case surrounding the crank shaft and secured to the driven shaft, radially extending pistons mounted on the crank shaft, cylinders secured to the crank case for said pistons with ports in their outer ends, means within the casing externally operable for controlling the admission of liquid from the casing into the ends of the cylinders, and a port in the side of each cylinder just beyond the outer end of the piston when at its inner limit of movement, substantially as and for the purpose set forth.

5. Clutch and speed control mechanism including a casing adapted to contain liquid, a driving crank shaft extending into the casing, a driven shaft in alignment with the crank shaft, a crank case surrounding the crank shaft and secured to the driven shaft, radially extending pistons mounted on the crank shaft, cylinders secured to the crank case for said pistons with ports in their outer ends, means within the casing externally operable for controlling the admission of liquid from the casing into the ends of the cylinders, and a by-pass inside of each cylinder leading from the outer end of the cylinder inward and discharging at a point adapted to be closed by the piston at all times excepting when approaching its outer limit of movement.

6. Clutch and speed control mechanism including a casing adapted to contain liquid, a driving crank shaft extending into the casing, a driven shaft in alignment with the crank shaft, a crank case surrounding the crank shaft and secured to the driven shaft, radially extending pistons mounted on the crank shaft, cylinders secured to the crank case for said pistons with ports in their outer ends, means within the casing externally operable for controlling the admission of liquid from the casing into the ends of the cylinders, a port in the side of each cylinder near its outer end, and a check valve for said port adapted to admit fluid to the cylinder but prevent fluid from leaving the cylinder, substantially as and for the purpose set forth.

In witness whereof, I have hereunto affixed my signature.

ROBERT C. BERRY.